June 30, 1964 J. B. SHIELDS ETAL 3,139,323
STERILIZING PROCESS
Filed Jan. 25, 1962
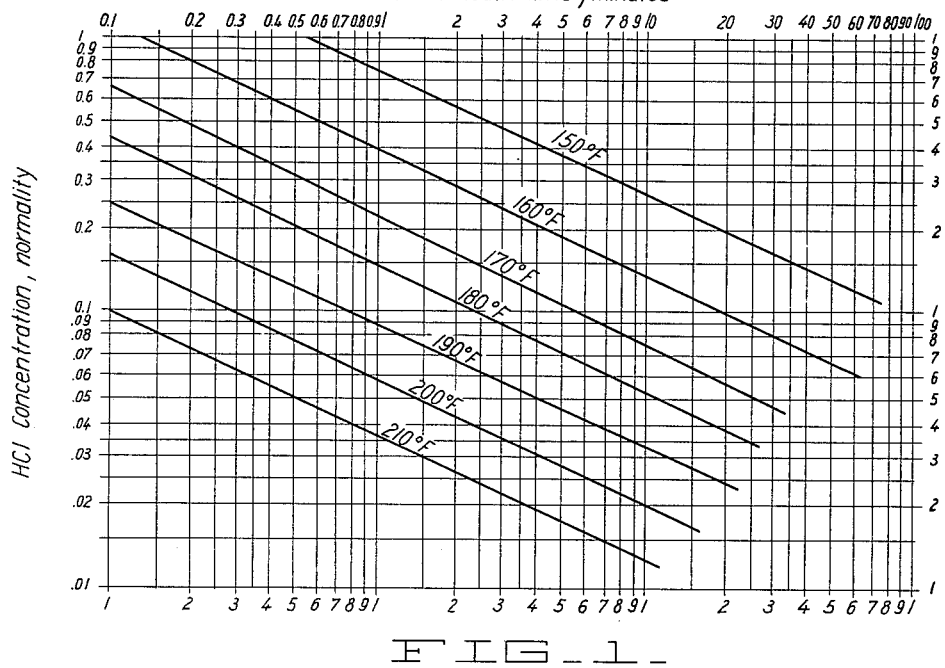
FIG_1_
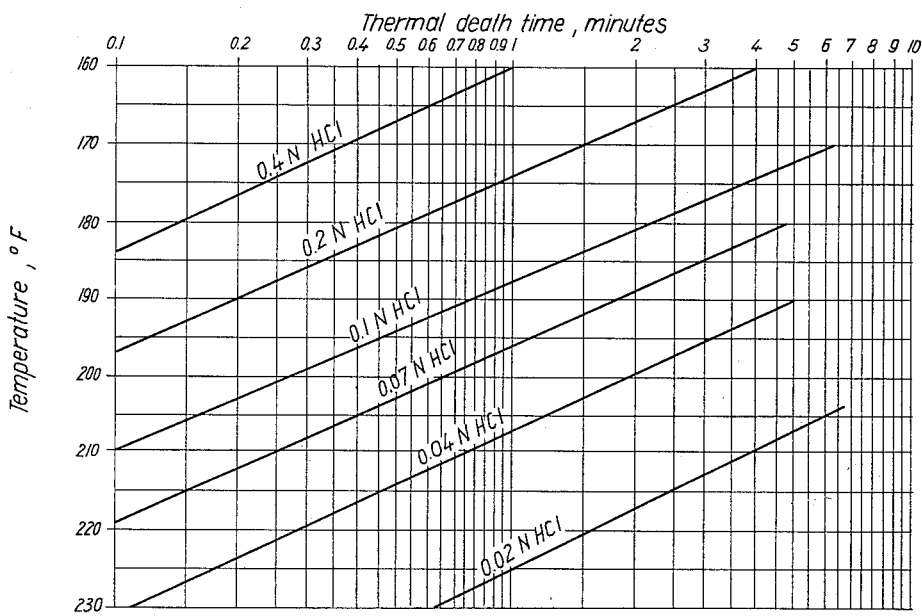
FIG_2_
INVENTORS.
John B. Shields
Donald F. Wilcox
BY
Flehr and Swain
ATTORNEYS.

United States Patent Office 3,139,323
Patented June 30, 1964

3,139,323
STERILIZING PROCESS
John B. Shields, Sunnyvale, and Donald F. Wilcox, Mill Valley, Calif., assignors to Foremost Dairies, Inc., San Francisco, Calif., a corporation of New York
Filed Jan. 25, 1962, Ser. No. 168,745
2 Claims. (Cl. 21—57)

This invention relates generally to processes for the sterilization of various items, and in particular is applicable to the sterilization of various enclosures or containers such as are employed in the food, drug and other industries.

Heating by direct contact with steam has been widely employed in the past to eliminate bacterial contamination. For example, in the fruit canning industry it is common to retort sealed cans of non-acid products at temperature levels of the order from 240 to 260° F., for periods of time ranging inversely from 3 to 20 minutes, to effect complete sterilization. Where aseptic canning methods are employed, the cans may be heated to temperature levels of from 375 to 425° F., for periods of from 4 to 1 minute, by contact with hot sterile gases, before the sterile food product is introduced into the cans and the cans sealed. Certain chemicals have been used for sterilization, as for example chemicals capable of destroying bacteria by oxidation, but they have not been used to any substantial extent in the food industry, due to mechanical difficulties of application, and to the possibility of introducing small amounts of contaminating chemical into the final products.

While the time-temperature requirements of conventional heat sterilization methods can be met in some instances it is generally recognized that it would be desirable in many applications to carry out effective sterilization at lower temperature levels and for reduced holding times. In this connection particular reference can be made to the problem of sterilizing the surfaces of plastic materials such as polyethylene, which tend to deteriorate when subjected to elevated temperatures for extended periods of time.

In general it is an object of the present invention to provide a novel sterilizing process making possible the use of reduced treatment temperatures and/or reduced holding times, for effective sterilization.

Another object of the invention is to provide a novel sterilizing process which can be applied to various plastic materials, including polyethylene, without any injurious effects.

A further object of the invention is to provide a process that can be employed for the sterilization of glass containers.

It is a further object of the invention to provide a process which can be applied to aseptic canning or packaging methods and particularly for the purpose of sterilizing the interior surfaces of a container before a food product or other material is introduced into the same.

Additional objects and features of the invention will appear from the following description in which the preferred embodiments are set forth in detail.

Referring to the drawing:

FIGURES 1 and 2 are graphs showing the effect of various factors involved in our process.

Our invention employs a procedure which produces an aqueous sterilizing film on surfaces to be made sterile. We have discovered that such a film can be produced by contacting the surface to be sterilized with a mixture of steam and certain gaseous chemicals, whereby a film is condensed upon the surface comprising a medium capable of carrying out sterilization at substantially reduced temperature levels and/or greatly reduced holding times. Chemical agents which we have found suitable for our process include hydrogen chloride, hydrogen iodide, hydrogen bromide, sulfur dioxide and chlorine. Of the chemical agents which we have found suitable, we prefer the use of hydrogen chloride or chlorine, especially as applicable to the food industry.

A relatively small amount of the chemical agent is employed in proportion to the steam. For example, when hydrogen chloride is used, good results can be obtained by utilizing proportions ranging from 99.964 to 96.4% steam to .036% to 3.6% hydrogen chloride by weight.

In actual practice we have found it desirable to utilize steam or water vapor at or about atmospheric pressure. The gaseous chemical, for example hydrogen chloride, can be homogeneously dispersed in the steam in various ways. For example, it can be directly introduced into the container or enclosure followed by introduction of steam, or it may be mixed with steam in suitable proportions and the mixture then introduced into the container to be sterilized. Also, a solution of water and the desired chemical agent can be vaporized by application of heat to produce the desired sterilization medium.

Contact of the mixture of steam and the chemical agent utilized with the surface of an object to be sterilized results in condensation upon the surface, with the condensate consisting of a solution of the chemical agent in water. This condensation can be relied upon to heat the surface to be sterilized to a sufficient temperature whereby in conjunction with the sterilizing medium used, sterility is obtained.

In instances where the presence of such condensate upon the container or other object is undesirable, it can be removed by various methods. For example the object can be subjected to dry sterile air at an elevated temperature, thereby removing the condensate by evaporation. In instances where the presence of sterile moisture is not objectionable, the surfaces may be washed with a sterile liquid, such as water, thus substituting water for the dilute solution.

In co-pending application Serial No. 131,773, filed August 16, 1961, in the joint names of Clayton A. Kempf, Jerry T. Hutton, and Donald F. Wilcox, there is disclosed a method utilizing our process in the sterilization of plastic bags made of materials like polyethylene. In that instance the mouth of a plastic bag to be sterilized is applied to a filling head, and after removing air from the bag, a sterilizing medium is introduced into the bag consisting of steam at atmospheric pressure, together with a small amount of anhydrous hydrochloric acid. By way of example, the proportions may be 99.64% steam and 0.36% hydrochloric acid by weight. After a short period of introduction of the sterilizing medium of say 20 seconds, the bag is held for a further period of the order of 30 seconds, to effect complete sterilization. During this sterilizing period, the inner surfaces of the plastic bag are heated to a temperature level of the order of 210° F. Thus complete sterilization was carried out at a temperature level of 210° F., for a time period of about 50 seconds. This is in contrast with the relatively higher temperature levels and extended holding periods required for complete sterilization with steam by itself. By way of example, steam at atmospheric pressure requires a holding period of the order of 1275 minutes for complete sterilization. Higher temperature levels of the order from 240 to 260° F., utilizing simple steam, require holding periods of the order from 20 to 3 minutes. It is obvious that steam at atmospheric pressure is impractical because of the long holding time, while a plastic material such as polyethylene would be severely damaged at the higher temperatures.

Aside from utilizing our process for the sterilization of plastic containers, it can be applied to the more common aseptic canning and packaging methods. For example, where the container to be sterilized is a metal can having a small vent hole in its top cover, a measured amount of water containing hydrochloric acid in solution, in the proportions specified above, can be introduced in the container. Thereafter the container is heated in a sterile chamber to the temperature of 212° F., thereby producing an atmosphere of water vapor together with hydrochloric acid, within the can. The vapor is gradually expelled through the vent hole of the can, but before being completely expelled, sterilization is completed. During the sterilizing period steam continually condenses on the inner surfaces of the can, to form a sterilizing medium containing hydrogen chloride. Thereafter the can can be filled through the vent hole with a sterile liquid, like milk, after which the hole is sealed.

Assuming application of the process to the sterilization of standard cans of the type having a cover applied by seaming, the cans and the lids may be protected by a coating of a suitable plastic material, to prevent metal corrosion. The cans and lids are exposed to an atmosphere of steam and hydrochloric acid, after which the cans and the covers may be exposed for a short interval to dry hot air to eliminate the presence of condensate. A sterile food material is now introduced into the cans and the lids applied and sealed.

FIGURES 1 and 2 of the drawing are graphs prepared to show the effects of varying temperatures, holding times, and concentrations of hydrogen chloride on the thermal death time of spores of *Bacillus stearothermophilus*.

FIGURE 1 is plotted between time versus hydrochloric acid concentration. Note that separate curves are shown for different temperature levels ranging from 150 to 210° F. It will be evident from an examination of this graph that the holding time required for effective terminalization is reduced as the concentration of hydrochloric acid is increased.

FIGURE 2 is another graph plotted between holding time and temperature of the sterilizing medium. Various curves on this graph have been plotted for different concentrations of hydrochloric acid ranging from .02 N to .4 N. An inspection of these curves shows that as the temperature is increased, the holding time is reduced for a given concentration of hydrochloric acid.

The laboratory data employed for the preparation of FIGURES 1 and 2 utilized a spore culture normally considered to be highly resistant to heat sterilization, namely, *Bacillus stearothermophilus*. In the laboratory procedure employed, appropriate dilutions of spore suspensions were made using various hydrochloric acid concentrations. 2 ml. quantities of these different spore suspensions were sealed in tubes measuring 10 x 75 mm., and the tubes then heated in water baths of constant temperatures. After cooling the contents, the various tubes were plated and spore counts determined.

In the foregoing we have described our process as being particularly applicable to the food industry, where it is desired to sterilize various containers preparatory to hermetic sealing. It will be evident that in many instances our process can be applied for sterilizing surfaces of various objects and materials, irrespective of whether or not such sterilization is preparatory to canning or packaging in a hermetically sealed container. Also in some instances sterilization may be applied to minimize bacterial contamination, although the ultimate package or container may not be hermetically sealed. Particular reference in this connection can be made to sterilization of bags and cartons preparatory to introducing foods or like products, which subsequently are preserved by refrigeration or freezing.

Examples of our process are as follows:

*Example 1.*—The container employed was a plastic bag with a normal volumetric capacity of 40 gallons, made with laminated walls consisting of an outside layer of Mylar, an inner layer of polyethylene, and an intermediate layer of Saran. The bag was first collapsed by applying a partial vacuum. Thereafter steam at slightly greater than atmospheric pressure was supplied to the interior of the bag, together with a small amount of anhydrous hydrochloric acid gas. The proportions corresponded to 99.64% steam and 0.36% hydrochloric acid by weight. Introduction of the sterilizing medium continued for a period of 20 seconds, to inflate the bag, thereby exposing all inner surfaces to the sterilizing medium, after which further introduction was discontinued and the bag held for a period of thirty seconds. An examination of the bag at this time revealed that its inner surfaces were completely sterile.

*Example 2.*—The container sterilized was a No. 10 soldered tin can, such as is used in the milk canning industry. The can had an opening of about .05 inch in diameter in its top well. Five grams of water were introduced into the can through the opening, the water containing an amount of hydrochloric acid whereby the proportions corresponded to 99.64% water and .36% hydrochloric acid by weight. Thereafter, the bottom of the can was heated until steam was coming out of the vent hole, for a period of 30 seconds. At the end of this time it was found that the inner surface of the can was dry and completely sterile.

*Example 3.*—The container sterilized was an 8-ounce glass jar. The jar was first preheated with hot air to a temperature of approximately 140° F. The jar, in an inverted position, was then contacted with a mixture of steam and hydrogen chloride at atmospheric pressure, the proportions being 98.2% steam to 1.8% hydrogen chloride by weight. Contact of the sterilizing medium with the surface of the jar was maintained for a period of 10 seconds. The jar was then rinsed with sterile water at a temperature of 140° F. Following this step the jar was filled with sterile milk and sealed with a lid which had been previously sterilized by contact with steam and hydrogen chloride in the proportions specified above. Subsequent bacteriological examination showed the jar and contents to be sterile.

We claim:

1. In a sterilizing process, the steps of contacting a surface to be sterilized and while at ambient temperature with steam at substantially atmospheric pressure and having homogeneously mixed therewith gaseous hydrogen chloride, the proportions ranging from approximately 99.964 to 96.4% steam to from .036 to 3.6% hydrogen chloride by weight, and causing said gaseous mixture to condense on said surface and thereby to heat said surface with heating of the same, said surface being thereby sterilized.

2. In a sterilizing process, the steps of contacting a surface to be sterilized with water vapor having homogeneously mixed therewith hydrogen chloride in gaseous phase, the proportions ranging from approximately 99.964 to 96.4% steam, to from .036 to 3.6% hydrogen chloride by weight, causing said gaseous mixture to condense on said surface and thereby to heat said surface to a temperature within the range of from approximately 150 to 212° F., and maintaining said contact and temperature for a period of approximately 10 seconds to 10 minutes.

References Cited in the file of this patent

UNITED STATES PATENTS 3,035,886    Hickey _____ May 22, 1962

FOREIGN PATENTS 11,479    Netherlands _____ Jan. 15, 1924
53,059    Denmark _____ May 10, 1937

OTHER REFERENCES

United States Dispensatory (hereinafter referred to as U.S.D), 24th edition, 1947, page 550, published by J. B. Lippincott Co., Philadelphia. (Copy in Div. 43.)